United States Patent
Yap et al.

(10) Patent No.: US 6,793,726 B1
(45) Date of Patent: Sep. 21, 2004

(54) AQUEOUS SUSPENSIONS WITH BENTONITE FOR MASTICS AND SEALANTS

(75) Inventors: Michael L. Yap, Oldsmar, FL (US); Raymond T. Hyer, Tampa, FL (US); Barton J. Malina, Riverview, FL (US)

(73) Assignee: Gardner Asphalt Corporation, Tampa, FL (US)

( * ) Notice: Subject to any disclaimer, the term of this patent is extended or adjusted under 35 U.S.C. 154(b) by 0 days.

(21) Appl. No.: 10/113,223

(22) Filed: Mar. 29, 2002

Related U.S. Application Data

(63) Continuation-in-part of application No. 09/887,383, filed on Jun. 22, 2001, now Pat. No. 6,616,743.

(51) Int. Cl.⁷ ............................................. C09D 195/00
(52) U.S. Cl. ..................... 106/278; 106/277; 106/283; 106/284.02
(58) Field of Search ................................ 106/277, 278, 106/283, 284.02; 507/126

(56) References Cited

U.S. PATENT DOCUMENTS

| | | | | |
|---|---|---|---|---|
| 4,279,547 A | | 7/1981 | Clem | 405/208 |
| 4,404,108 A | * | 9/1983 | Cates | 507/106 |
| 5,368,692 A | | 11/1994 | Derrick | 162/181.8 |
| 5,840,105 A | | 11/1998 | Helmstetter | 106/18.12 |
| 5,860,772 A | | 1/1999 | Starita et al. | 405/270 |
| 5,970,893 A | | 10/1999 | Starita et al. | 112/2 |
| 6,019,830 A | * | 2/2000 | Yap et al. | 106/277 |
| 6,616,743 B1 | * | 9/2003 | Yap et al. | 106/277 |

* cited by examiner

Primary Examiner—David Brunsman
(74) Attorney, Agent, or Firm—Jansson, Shupe & Munger, Ltd.

(57) ABSTRACT

Compositions of an aqueous suspension of a drilling mud bentonite conforming to API specification 13A for mastic and sealant compositions.

15 Claims, No Drawings

AQUEOUS SUSPENSIONS WITH BENTONITE FOR MASTICS AND SEALANTS

CROSS-REFERENCE TO RELATED APPLICATIONS

This application is a continuation-in-part of pending application Ser. No. 09/887,383, filed Jun. 22, 2001 now U.S. Pat. No. 6,616,743, the disclosure of which is incorporated by reference herein.

BACKGROUND OF THE INVENTION

1. Field of the Invention

The use of a specific drilling mud bentonite provides superior aqueous thickness and particle suspenders for mastics and sealants for cold application. The formulations provide low cost, high performance and process simplicity. Furthermore, the newly discovered compositions are environmentally friendly; they reduce by about half the volatile organic compound emissions (VOC) from the traditional Bituminous Mastics and Sealants for Cold Application. They also mix well in non-carcinogenic causing fibers to produce an asbestos free product.

2. Description of the Background Art

U.S. Pat. No. 5,840,105 discloses the use of bentonite from drilling muds for sodium silicate and fine mica coatings. U.S. Pat. No. 5,970,893 discloses clay liners as barriers for the containment of pollutants or toxic waste.

SUMMARY OF THE INVENTION

It has now been found that aqueous suspensions of specific drilling mud bentonite provide formulations that have markedly decreased costs and improved properties for aqueous mastic and sealant application. It is surprising that this specialty bentonite provides such superior results outside the petroleum drilling mud field.

DETAILED DESCRIPTION OF THE PREFERRED EMBODIMENT

The drilling mud bentonite conform to American Petroleum Institute (API) specification 13A which yield approximately 120 to 280 barrels of 15 centiposes mud per ton, preferably about 180 to 240 barrels per ton. Typical bentonites with their trademarks are Hydraul-EZ; KWIK-THIK and Super-Gel-X. The use of non-treated bentonite in bituminous and other polymer binders is well known. The treated bentonite clay from drilling industries was discovered to be surprisingly, an excellent component in water soluble systems of bituminous mastics and sealants for cold application.

Asphalt is a bitumen derived from a number of materials such as, for example, petroleum shale oil, gilsonite and the like. Asphalt is a thick, viscous mixture of compound such as parraffinic, cycloaliphatic and aromatic hydrocarbon and lesser amounts of heterocyclic compound containing sulphur, nitrogen or oxygen. Although asphalt can be obtained from natural sources, it is primarily derived as the residue of petroleum distillation of (e.g., the bottom product of vacuum distillation is of a topped crude). Although this invention is not limited thereto, it is preferred that the asphalt have a penetration (ASTM D5) at 77 degree F., dmm: ranging from about 5 to about 300 dmm and more preferably, from about 50 to about 160 dmm and conform in general to specification outlined by ASTM D312, D946 and/or D449.

Asphalt cutback is a mixture of asphalt bitumen and petroleum solvent. Petroleum solvents can be one of the following: kerosene, fuel oils, jet fuel, mineral spirit/Stoddard, naphtha, high flash aromatic, low flash aromatic, xylene, toluene and other petroleum solvent products. For this invention the preferable asphalt cutback is a mixture of asphalt bitumen and mineral spirit/Stoddard solvent, the asphalt bitumen ranging from about 55 to 85 wt. %.

A process of producing water reducible bituminous mastics and sealants is as follows:

1. 4% to 11% treated bentonite clay was to be added into clean water in the mixer. When clay is dispersed, or high sheared in colloid mill, after mixing it turns into clay slurry. The viscosity of clay slurry is between 20,000 to 180,000 centipoise (CPS) at 77 deg. F.
2. Asphalt bitumen cutback consists of 60 to 80 percent asphalt and 20 to 40 percent mineral spirit Stoddard solvent.
3. The clay slurry and asphalt bitumen cutback are mixed together to form a soluble system.
4. An additive is added to enhance the stability of the soluble system.
5. Non-asbestos fiber is added to reinforce the soluble system mastics and sealer film strength. It also provides additional viscosity and texture.

Included are cellulosic paper, fiberglass, mineral fiber, polymer fiber including polypropylene and polyethylene.

6. Non-reactive fillers commonly called pigment extenders are e.g. natural or calcined clay, mica and silica powder, slate powder, coal ash, fly ash, etc. are added to the system to improve film strength and product's consistency.
7. The elastomers impart buffering as well as tensile strength and elongation to the formulations and include SBR, SBS, SIBS, acrylic, styrene, neoprene, polyvinyl, etc.

EXAMPLE 1

The Preparation of Bituminous Mastic

|  | % By weight |
|---|---|
| Treated bentonite clay slurry | 3–60 |
| Asphalt Bitumen Cutback | 20–90 |
| Fibers | 2–10 |
| Fillers | 3–15 |
| Additives | 0.2–1.0 |
|  | 100.0 |

This formulation is used for patching repair, roof flashing repairs and installation.

EXAMPLE 2

The Preparation of Bituminous Sealants

|  | % By weight |
|---|---|
| Treated bentonite clay slurry | 3–60 |
| Asphalt Bitumen Cutback | 20–90 |
| Fibers | 2–6 |
| Fillers | 3–10 |
| Additives | 0.2–1.0 |
|  | 100.0 |

This formulation is used for recoating by brush application on foundation walls, roof, metal, wood, concrete and other building materials.

EXAMPLE 3

The Preparation of Bituminous Non-fiber Sealants

|  | % By weight |
|---|---|
| Treated bentonite clay slurry | 3–60 |
| Asphalt Bitumen Cutback | 20–90 |
| Fillers | 3–10 |
| Additives | .2–1.0 |
|  | 100.0 |

This formulation has similar uses as Example 2, except for spray application.

EXAMPLE 4

The Preparation of Elastomeric Bituminous Non-fiber Mastics

|  | % By weight |
|---|---|
| Treated bentonite clay slurry | 3–60 |
| Asphalt Bitumen Cutback | 20–90 |
| Fibers | 2–10 |
| Fillers | 3–15 |
| Additives | 0.2–1.0 |
| Elastomers (Elastomeric polymers) | 0.5–5 |
|  | 100.0 |

This lends itself to both roofing and foundation application.

EXAMPLE 5

The Preparation of Elastomeric Bituminous Sealants

|  | % By weight |
|---|---|
| Treated bentonite clay slurry | 3–60 |
| Asphalt Bitumen Cutback | 20–90 |
| Fibers | 2–6 |
| Fillers | 3–10 |
| Additives | 0.2–1.0 |
| Elastomers | 0.5–3 |
|  | 100.0 |

EXAMPLE 6

The Preparation of Elastomeric Non-fiber Sealant

|  | % By weight |
|---|---|
| Treated bentonite clay slurry | 3–60 |
| Asphalt Bitumen Cutback | 20–90 |
| Fillers | 3–10 |
| Additives | 0.2–1.0 |
| Elastomers (Elastomeric polymers) | 0.5–6 |
|  | 100.0 |

Subject to the foregoing, the ranges and descriptions of components are about:

|  | % By weight |
|---|---|
| Drilling mud bentonite | .5–11 |
| Water | 3–55 |
| Asphalt bitumen Cutback containing 60 to 80 wt. % asphalt and 20–40 wt. % mineral spirit Stoddard Solvent | 20–90 |
| Additives | .2–1 |
| Non Asbestos fiber | 0–10 |
| Fillers | 3–15 |
| Elastomer | 0–8 |

Of course, the individual amounts are selected to provide a 100% total.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A method of preparing an aqueous mastic and sealant suspension, the method comprising mixing bentonite conforming to API specification 13A with asphalt bitumen.

2. The method of claim 1 wherein the bentonite yields about 180 to 240 barrels per ton.

3. The method of claim 1 wherein the bentonite is mixed with water to form a clay slurry before being mixed with the asphalt bitumen.

4. The method of claim 3 wherein the asphalt bitumen is an asphalt bitumen cutback consisting of 60–80% asphalt and 20–40% mineral spirit Stoddard solvent.

5. The method of claim 4 wherein the suspension comprises 0.5–1.1 wt. % bentonite, 3–55 wt. % water and 20–90 wt. % asphalt bitumen cutback.

6. The method of claim 5 further comprising adding an additive, non-asbestos fiber, fillers and an elastomer to the suspension such that the suspension comprises 0.2–1 wt. % additives, 0–10 wt. % non asbestos fiber, 3–15 wt. % fillers and 0–8% elastomer.

7. The method of claim 3 wherein the clay slurry has a viscosity of between 20,000 to 180,000 centipoise at 77° F.

8. An aqueous mastic and sealant suspension comprising:

0.5–11 wt. % bentonite conforming to API specification 13A;

3–55 wt. % water; and

20–90 wt. % asphalt bitumen cutback containing 60–80% asphalt.

9. The suspension of claim 8 further comprising:

0.2–1 wt. % additives;

0–10 wt. % non-asbestos fiber;

3–15 wt. % fillers; and

0–8 wt. % elastomer.

10. The suspension of claim 8 wherein the suspension emits about 50% less volatile organic compounds than traditional bituminous mastics and sealants for cold application.

11. An aqueous mastic and sealant suspension having low volatile organic compound emissions, the suspension comprising bentonite conforming to API specification 13A, water and asphalt bitumen cutback.

12. The suspension of claim 11 wherein the suspension emits 50% less volatile organic compounds than traditional bituminous mastics and sealants for cold application.

13. The aqueous suspension of claim 11 wherein the asphalt bitumen contains 60–80% asphalt.

14. The aqueous suspension of claim 11 further comprising additives, non-asbestos fiber, fillers and elastomer.

15. The aqueous suspension of claim 14 wherein the suspension is comprised of:

0.5–11 wt. % bentonite conforming to API specification 13A;

3–55 wt. % water;

20–90 wt % asphalt bitumen cutback containing 60–80% asphalt.

0.2–1 wt. % additives;

0–10 wt. % non-asbestos fiber;

3–15 wt. % fillers; and

0–8 wt. % elastomer.

* * * * *